Nov. 4, 1941.  E. W. LEWIS  2,261,653

ARTIFICIAL FLOWER

Filed Aug. 1, 1940

INVENTOR.
ELEANOR WIDDER LEWIS

BY A. A. de Bonneville
ATTORNEY.

Patented Nov. 4, 1941

2,261,653

UNITED STATES PATENT OFFICE 2,261,653

ARTIFICIAL FLOWER

Eleanor Widder Lewis, Forest Hills, N. Y.

Application August 1, 1940, Serial No. 349,084

3 Claims. (Cl. 299—20)

This invention relates to an artificial flower.

The object of the invention is the production of an artificial flower, which has associated therewith means to evaporize cologne or other fluids, such as a disinfectant.

The second object of the invention is the production of an artificial flower with a container for a vaporizing fluid, the container being constructed to permit the fluid therein to continue its vaporization as desired and to be stopped when desired.

The third object of the invention is the production of an artificial flower with a container for a fluid to be vaporized, the construction of the container being such that the leaves of an artificial flower or a plurality of them can be easily positioned around the container and fashioned in place.

Various other objects of the invention will be apparent from the specification, drawing and claims.

Figure 5:
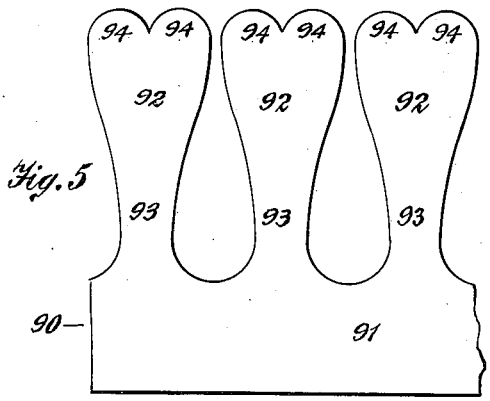
Figure 1:
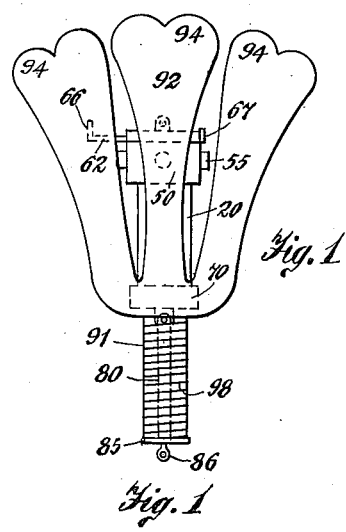
Figure 2:
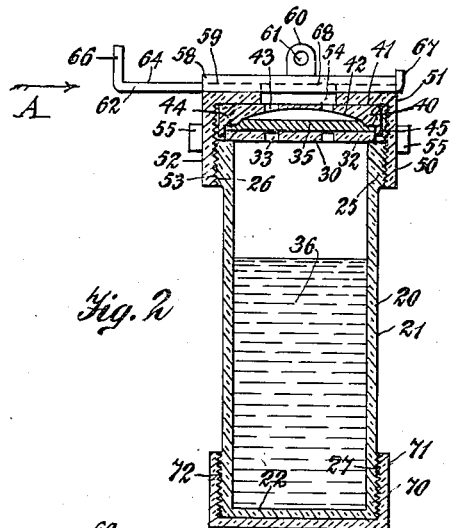
Figure 4:
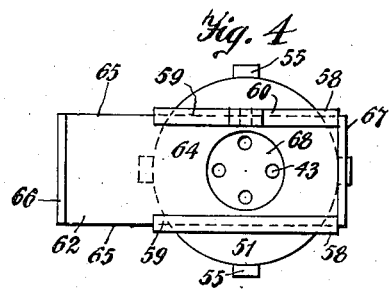
Figure 6:
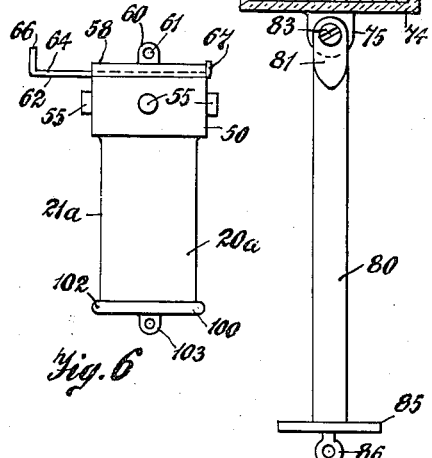
Figure 3:
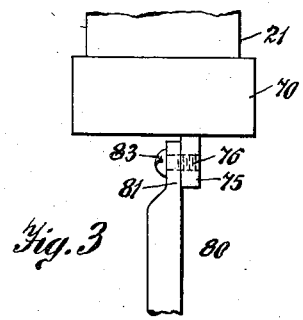

In the accompanying drawing Fig. 1 represents an elevation of the artificial flower with its container and appurtenances; Fig. 2 shows an enlarged partial longitudinal section of the container and some of its appurtenances in full lines; Fig. 3 is a right hand view of a portion of Fig. 2 in full lines; Fig. 4 represents a top view of Fig. 2; Fig. 5 shows an elevation of a portion of a strip of material which forms a plurality of the leaves of the flower before being positioned in place and Fig. 6, represents an elevation on an enlarged scale of a modification of the container for the artificial flower.

Referring to Figs. 1 to 5, the container 20 for the flower in this instance is of glass and comprises the cylindrical body portion 21, open at its top end, and the bottom wall 22. The body portion 21, is indicated with the enlarged upper portion 25, having the thread 26 on its outer surface. A thread 27 is indicated on the outer surface of the lower end of said body portion 21.

A housing designated in its entirety by the numeral 30, comprises the disc 32 of glass for its bottom member and which has a plurality of openings 33. Upon the disc 32, is positioned a disc 35 of membrane or other suitable porous material, which will permit the passage of vapors therethrough from the fluid 36, in the container 20, but will not permit the said fluid to pass therethrough. Above the disc 35, is positioned the cup shaped top member 40 of the housing 30.

The said top member 40 is shown with the top flat face 41, and the cup shaped or spherical shaped bottom face 42. A plurality of openings 43, extend through the top member 40. A circumferential flat seat 44, extends from the perimeter of the spherical shaped bottom face 42, and an annular projecting flange 45 is indicated at the lower end of the member 40 and projects from the flat seat 44.

The flange 45, bears against a circumferential portion of the disc 35. With the construction of the housing 30, the disc 35 is clamped at a circumferential portion thereof while the remainder thereof is free.

Above the top member 40 of the housing 30, is shown the cover designated in its entirety by the numeral 50. The said cover 50 comprises the top wall 51, from which extends the barrel 52, having the thread 53 on its inner face which meshes with the thread 26, of the enlarged upper portion 25, of the cylindrical body portion 21. A circular opening 54, is formed in the wall 51. Knots 55, extend from the barrel 52. From the top wall 51 extend a pair of parallel guides 58, with the parallel longitudinal grooves 59. One of the guides 58, has integral therewith the eyelet 60, having the opening 61. A wire or cord may extend through the opening 61 to suspend the container 20 and its appurtenances. A valve 62, is shown with flat body portion 64, having the longitudinal edges 65. An operating end 66, is formed at one end of the body portion 64, and at right angles thereto, and the stop end 67, is provided for the other end of the body portion 64, at right angles thereto. The said stop end 67 is preferably cemented to the body portion 64, for easy construction. In the body portion 64, is found the circular opening 68. The body portion 64 bears upon the top face of the top wall 51, and its longitudinal edges 65, are guided in the grooves 59.

The lower portion of the cylindrical body portion 21, has in threaded engagement therewith the cap 70, preferably of metal and comprises the cylindrical barrel 71, with the internal thread 72, which meshes with the thread 27. The bottom wall of the cap 70 is shown at 74, and has extending therefrom the lug 75, with the threaded opening 76.

A handle preferably of metal is indicated in its entirety by the numeral 80, and at its top portion has integral therewith the flattened end 81. A screw 83, extends through an opening in the flattened end 81 and engages the threaded opening 76. A disc 85, is integral with the lower end of the handle 80, and has extending therefrom the eyelet 86. By means of the eyelet 86, the handle 80 may be tied by a cord or wire in operative position. The handle 80 may be positioned at various angles to the longitudinal axis of the container 20, and may be inserted through a button hole of a garment to hold the artificial flower, as is the custom with natural flowers.

Referring to Fig. 5, a development of a portion of the flower is shown. The development in this instance is made of a strip 90, of paper. A plurality of strips may be used, and the strip or strips may be made of various other suitable, flexible materials. The strip 90, in this instance comprises the lower or base portion 91, from which extend upwardly a plurality of leaves 92, of the flower. Each leaf 92, is indicated with the narrow lower portion 93, and the crown with the pair of circular portions 94.

Attention is called to the fact that instead of one strip 90, a plurality of strips may be used. The strips may all be of the same height, but may vary in height. The shorter strips are used for the outer leaves of the flower and the longer strips for the inner leaves thereof.

Also the strips where a plurality are used may be the same or of different shades of color or may be of different colors. If only one strip is used it has its base portion 91, see Fig. 1, wound around the handle 80, and clamped in place by the wire 98. The leaves 92, of a few of the outer windings are bent somewhat downwardly to represent the leaves of a natural flower.

If a plurality of strips of material are used, the base portion 91, of the first windings is wound around the handle 80, for the inner leaves of the flower, next the base portion 91, of the second strip, which is preferably less in height than the first strip, and may be of a different shade or color is wound around the base portion of the first strip, next the base portion of the third strip, which is preferably of less height than the second strip and of the same or different shade or color than the second strip has its base portion 91 wound around the base portion of the second strip and so on until all the required number of strips are wound in place. The wire 98 is wound around the base portion of the outermost strip and tightened in place.

Referring to Fig. 6, which represents a modification of the invention, the container is designated in its entirety by the numeral 20a. The said container 20a, comprises the cylindrical body portion 21a, preferably of glass and which has integral therewith at its lower end the bottom wall 100, which latter projects beyond the body portion 21a, as shown at 102.

An eyelet 103 extends from the wall 100. Upon the upper end of the body portion 21a, is again positioned the housing 30, not shown, and as described, with the disc 35 of porous material as described.

The cover 50, as described is in threaded engagement with the upper end of the body portion 21a. The cover is again provided with its knobs 55, the guides 58, and one of the latter is shown with the eyelet 60 having the opening 61. The valve 62, with its body portion 64, and its end stops 66 and 67, are again shown.

In the modified form of the invention indicated in Fig. 6, the strip 90 or a plurality of strips are wound around the cylindrical body portion 21a, as described for the handle 80, and are fastened thereto by a wire 98 as described between the lower edge of the cover 50, and the bottom wall 100.

When the flower is to be used the containers 20 or 20a, are filled with the vaporous fluid, like cologne and the like by removing the cover 50, and housing 30 and pouring the fluid 36, into the container. The cover 50, and housing 30, is then again put in place and the valve 62, is moved to the position indicated in the drawing with the stop end 67, abutting against the adjacent ends of the guides 58, to position the opening 68 over the plurality of openings 43, of the member 41, of the housing 30. If desired the valve 62 may be positioned to uncover less than the whole number of the openings 43. When the vaporization of the fluid 36 is to be stopped the valve 62, as shown is moved in the direction of the arrow A, see Fig. 2, so that its body portion 64, closes the openings 54 of the wall 51.

Various modifications may be made in the invention and the present exemplifications are to be taken as illustrative and not limitative thereof.

Having described my invention I claim:

1. For an artificial flower and the like the combination of a container for a vaporous fluid, said container comprising a cylindrical body portion open at its top end, a bottom wall for said body portion, a housing detachably supported at the open top end of the container, said housing comprising a bottom member consisting of a disc with a plurality of openings therethrough, a cup shaped top member above said disc, said top member having a top flat face with a plurality of openings extending therethrough and having a cup shaped bottom face, said top member having a circumferential flat seat extending from the perimeter of the cup shaped bottom face and said circumferential flat seat having an annular projecting flange extending downwardly therefrom, a disc of material positioned upon the bottom member of the housing porous to vapors only of the fluid in the container and said flat seat of the top member bearing on said disc of porous material, the circumferential edge portion of the disc of porous material securely held in place, and its major central portion free, a cover at the open end of the container bearing on the top face of the top member of the housing, said cover having an opening and a valve functioning with the opening of the cover.

2. In an artificial flower the combination of a container open at its top end, for a vaporous fluid, a disc of material porous to vapors only of said fluid supported at the open end of the container, a cover detachably connected to the container at its open end above said disc, said cover having an opening and having a pair of paralleled guides each with a groove on opposite sides of its opening and a valve with an opening supported by said cover and guided by said guides, said valve having an operating end at one end thereof and a stop end at its other end, said ends adapted to bear against the ends of said guides.

3. In an artificial flower the combination of a container open at its upper end and closed at its bottom end for a vaporous fluid, a housing detachably supported at the top end of the container, said housing comprising a bottom member consisting of a disc with a plurality of openings therethrough, a cup shaped top member above said disc functioning therewith and having openings extending therethrough, a disc of material porous to vapors only of the fluid in the container and tightly held at the perimeter of said disc and said top member, the remainder of said disc of material being free, a cover with an opening detachably connected to the top end of the container and bearing on the top face of the housing and a valve bearing on the top face of the cover and functioning with the opening therein.

ELEANOR WIDDER LEWIS.